(12) United States Patent
Sumpter

(10) Patent No.: US 12,275,816 B2
(45) Date of Patent: Apr. 15, 2025

(54) EPOXY RESIN COMPOSITIONS AND COATING SYSTEMS

(71) Applicant: Hexion Inc., Columbus, OH (US)

(72) Inventor: Matthew Sumpter, Richmond, TX (US)

(73) Assignee: WESTLAKE EPOXY INC., Houston, TX (US)

( * ) Notice: Subject to any disclaimer, the term of this patent is extended or adjusted under 35 U.S.C. 154(b) by 0 days.

(21) Appl. No.: 17/731,580

(22) Filed: Apr. 28, 2022

(65) Prior Publication Data

US 2023/0348655 A1 Nov. 2, 2023

(51) Int. Cl.
| | | |
|---|---|---|
| *C08G 59/24* | (2006.01) | |
| *C08F 220/28* | (2006.01) | |
| *C08G 59/50* | (2006.01) | |
| *C09D 163/00* | (2006.01) | |

(52) U.S. Cl.
CPC .......... *C08G 59/24* (2013.01); *C08F 220/283* (2020.02); *C08G 59/5026* (2013.01); *C09D 163/00* (2013.01); *C08G 2150/00* (2013.01)

(58) Field of Classification Search
CPC ................ C08G 59/24; C08G 59/5026; C08G 2150/00; C08F 220/283; C09D 163/00
USPC ....................................................... 525/530
See application file for complete search history.

(56) References Cited

U.S. PATENT DOCUMENTS

| | | |
|---|---|---|
| 5,021,537 A | 6/1991 | Pietruszka et al. |
| 5,288,802 A | 2/1994 | Waters et al. |
| 5,424,365 A | 6/1995 | Elmore et al. |
| 5,426,148 A | 6/1995 | Tucker |
| 6,432,483 B1 | 8/2002 | Jaycox et al. |
| 6,677,426 B2 | 1/2004 | Noro et al. |
| 2005/0004321 A1* | 1/2005 | Grady .................. C09D 133/14 427/388.1 |
| 2006/0188811 A1 | 8/2006 | Tani |
| 2010/0272886 A1 | 10/2010 | Vaes et al. |
| 2011/0039108 A1* | 2/2011 | Goeb ..................... C09J 163/00 156/330 |
| 2020/0123311 A1* | 4/2020 | Teichert ............. C08G 59/5026 |

OTHER PUBLICATIONS

"Improved Cardanol Derived Epoxy Coatings.", Darroman et al., Progress in Organic Coatings, vol. 91, Feb. 2016, pp. 9-16.

* cited by examiner

*Primary Examiner* — David T Karst
(74) *Attorney, Agent, or Firm* — Patterson + Sheridan, LLP

(57) ABSTRACT

Embodiments of the present disclosure generally relate to epoxy resin compositions and coating systems used to form epoxy resin compositions. In an embodiment, an epoxy resin composition is provided. The resin composition includes an epoxy resin; a curing agent; and an acetoacetoxy-functionalized polymer.

19 Claims, No Drawings

EPOXY RESIN COMPOSITIONS AND COATING SYSTEMS

FIELD

Embodiments of the present disclosure generally relate to epoxy resin compositions and coating systems formed from epoxy resin compositions.

BACKGROUND

Epoxy resins are widely used as coatings and sealants due to their excellent thermal and mechanical properties. Bisphenol epoxy resins, such as bisphenol A and bisphenol F, represent the majority of epoxy resins utilized. Due to certain performance properties, cycloaliphatic epoxy resins are currently used as an alternative to the bisphenol epoxies. However, cycloaliphatic epoxy resins have much slower drying times as a result of lower reactivity.

To date, conventional technologies for accelerating cycloaliphatic epoxy resins' dry times with amines has caused additional problems. For example, low molecular weight polyacetoacetates and polyesters have shown the ability to speed the resin drying time, but the resulting resins have poor chemical resistance, poor gloss retention, and poor mechanical properties.

Therefore, there is a need for new and improved epoxy resin compositions and coating systems used to form epoxy resin compositions.

SUMMARY

Embodiments of the present disclosure generally relate to epoxy resin compositions and coating systems used to form epoxy resin compositions. Unlike previous technologies, embodiments of the present disclosure can be fast drying, high molecular weight resin compositions. Further, embodiments described herein can be used in exterior and interior applications.

In an embodiment, a resin composition is provided. The resin composition includes: an epoxy resin an epoxy resin; a curing agent; and an acetoacetoxy-functionalized polymer having a weight average molecular weight of about 1000 g/mol to about 100,000 g/mol, the acetoacetoxy-functionalized polymer comprising: acetoacetoxy-functionalized monomer units; and co-monomer units comprising an acrylate monomer, a methacrylate monomer, an alpha-olefin monomer, a vinyl halide monomer, a diester of a carboxylic acid monomer, an unsaturated nitrile monomer, an alpha, beta-unsaturated carboxylic acid monomer, an alpha, beta-unsaturated amide monomer, or combinations thereof.

In another embodiment, a composition comprising an epoxy polymerization product of a reaction mixture is provided. The reaction mixture includes an epoxy resin; a curing agent; and an acetoacetoxy-functionalized polymer having a weight average molecular weight of about 1000 g/mol to about 100,000 g/mol, the acetoacetoxy-functionalized polymer comprising: acetoacetoxy-functionalized monomer units; and co-monomer units comprising an acrylate monomer, a methacrylate monomer, an alpha-olefin monomer, a vinyl halide monomer, a diester of a carboxylic acid monomer, an unsaturated nitrile monomer, an alpha, beta-unsaturated carboxylic acid monomer, an alpha, beta-unsaturated amide monomer, or combinations thereof.

In another embodiment, a coating system is provided. The coating system includes a first component and a second component. The first component includes an epoxy resin; and an acetoacetoxy-functionalized polymer having a molecular weight of about 1000 g/mol to about 100,000 g/mol, the acetoacetoxy-functionalized polymer comprising: acetoacetoxy-functionalized monomer units; co-monomer units comprising an acrylate monomer, a methacrylate, an alpha-olefin, a vinyl halide monomer, a diester of a carboxylic acid monomer, an unsaturated nitrile monomer, an alpha, beta-unsaturated carboxylic acid monomer, an alpha, beta-unsaturated amide monomer, or combinations thereof. The second component of the coating system includes a curing agent.

DETAILED DESCRIPTION

Embodiments of the present disclosure generally relate to epoxy resin compositions and coating systems used to form epoxy resin compositions. In contrast to conventional resin compositions, the resin compositions described herein are fast drying, high molecular weight resin compositions. The epoxy resin compositions described herein can also withstand degradation to chemicals and can be used in exterior and interior applications. Although acetoacetoxy-functionalized materials, such as polyacetoacetates, have been utilized with conventional epoxy resins, the acetoacetoxy-functionalized materials of such conventional resins are low molecular weight, such as less than 1,000 g/mol. Commonly, the polyacetoacetates are acetoacetates of alcohols such as trimethylolpropane. In contrast, the acetoacetoxy-functionalized polymers described herein have higher molecular weights, and increase dry speeds when formulated with the epoxy and polyamine.

In addition, embodiments described herein relate to coating systems and coating formulations made of two or more components, commonly referred to as "2K systems" or "2K coating formulations." The first and second components are mixed together just before application to a resin. The terms "coating system", "2K system", and "2K coating formulation" are used interchangeably such that reference to one includes reference to the other. For example, reference to "coating system" includes reference to "coating system", "2K coating formulation", and "2K system." In 2K systems, a first component is a resin and a second component is a curing agent. In some embodiments, and as further described below, a coating system described herein can include a first component and a second component. The first component includes an acetoacetoxy-functionalized polymer and an epoxy resin, and the second component includes a curing agent.

Embodiments described herein generally relates to epoxy resin compositions. The epoxy resin compositions described herein can be used as coatings, sealants, adhesives, among other applications. The inventor has found that the resin compositions described herein, relative to conventional technologies, are fast drying, among other properties. As used herein, a "composition" can include component(s) of the composition, reaction product(s) of two or more components of the composition, a remainder balance of remaining starting component(s), or combinations thereof. Compositions of the present disclosure can be prepared by any suitable mixing process.

In some embodiments, resin compositions of the present disclosure include an acetoacetoxy-functionalized polymer, an epoxy resin component, and a curing agent. Resin compositions can include a reaction product of an acetoacetoxy-functionalized polymer, an epoxy resin component, a curing agent, or combinations thereof.

The acetoacetoxy-functionalized polymer is formed from one or more polymerizable monomers. The one or more polymerizable monomers includes first monomers comprising one or more acetoacetoxy-functionalized acrylate monomers or acetoacetoxy-functionalized methacrylate monomers. The one or more polymerizable monomers can also include second monomers that are different from the first monomers. Such second monomers include, but are not limited to, acrylate monomers, methacrylate monomers, vinyl monomers, combinations thereof, among other polymerizable monomers as further described below. The term "(meth)acrylate" refers to both the acrylate and the methacrylate equally.

The acetoacetoxy-functionalized polymer can be a polymer or copolymer, and can have a weight average molecular weight (Mw) of about 1,000 g/mol or more, about 100,000 g/mol or less, or both. In at least one embodiment, the Mw of the acetoacetoxy-functionalized polymer can be from about 1,000 g/mol to about 60,000 g/mol, such as from about 1,000 g/mol to about 50,000 g/mol, such as from about 2,000 g/mol to about 20,000 g/mol, such as from about 3,000 to about 15,000 g/mol, such as from about 4,000 g/mol to about 14,000 g/mol, such as from about 5,000 g/mol to about 13,000 g/mol, such as from about 6,000 g/mol to about 12,000 g/mol, such as from about 7,000 g/mol to about 11,000 g/mol, such as from about 8,000 g/mol to about 10,000 g/mol. In some embodiments, the Mw (in units of g/mol) of the acetoacetoxy-functionalized polymer can be 1,000, 2,000, 3,000, 4,000, 5,000, 6,000, 7,000, 8,000, 9,000, 10,000, 11,000, 12,000, 13,000, 14,000, 15,000, 16,000, 17,000, 18,000, 19,000, 20,000, 21,000, 22,000, 23,000, 24,000, 25,000, 26,000, 27,000, 28,000, 29,000, 30,000, 31,000, 32,000, 33,000, 34,000, 35,000, 36,000, 37,000, 38,000, 39,000, 41,000, 42,000, 43,000, 44,000, 45,000, 46,000, 47,000, 48,000, 49,000, 50,000, 51,000, 52,000, 53,000, 54,000, 55,000, 56,000, 57,000, 58,000, 59,000, 60,000, 61,000, 62,000, 63,000, 64,000, 65,000, 66,000, 67,000, 68,000, 69,000, 70,000, 71,000, 72,000, 73,000, 74,000, 75,000, 76,000, 77,000, 78,000, 79,000, 80,000, 81,000, 82,000, 83,000, 84,000, 85,000, 86,000, 87,000, 88,000, 89,000, 90,000, 91,000, 92,000, 93,000, 94,000, 95,000, 96,000, 97,000, 98,000, 99,000, or 100,000, or ranges thereof, though higher or lower values are contemplated. Each of the foregoing numbers can be preceded by the word "about," "at least about," "less than about," or "more than about," and any of the foregoing numbers can be used singly to describe an open-ended range or in combination to describe a close-ended range. The weight average molecular weight (Mw) is determined as described in the Examples.

The acetoacetoxy-functionalized polymer can have a glass transition temperature (Tg) of about −50° C. to about 110°, such as from about −10° to about 100°, such as from about 0° C. to about 80° C., such as from about 20° C. to about 70° C., such as from about 30° C. to about 60° C., such as from about 40° C. to about 50° C. In some embodiments, the Tg (in units of ° C.) of the acetoacetoxy-functionalized polymer can be −50, −49, −48, −47, −46, −45, −44, −43, −42, −41, −40, −39, −38, −37, −36, −35, −34, −33, −32, −31, −30, −29, −28, −27, −26, −25, −24, −23, −22, −21, −20, −19, −18, −17, −16, −15, −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, or 110, or ranges thereof, though higher or lower values are contemplated. Each of the foregoing numbers can be preceded by the word "about," "at least about," "less than about," or "more than about," and any of the foregoing numbers can be used singly to describe an open-ended range or in combination to describe a close-ended range. The Tg of the acetoacetoxy-functionalized polymer is determined as described in the Examples.

The acetoacetoxy-functionalized polymer can have a total solids content (in units of % non-volatile solids) can be at least about 30%, such as from about 30% to about 90%, such as from about 40% to about 70%, such as from about 50% to about 60%, based on the total % of the acetoacetoxy-functionalized polymer. In some embodiments, the total solids content (in units of % non-volatile solids) in the acetoacetoxy-functionalized polymer can be about 5, 10, 15, 20, 25, 30, 35, 40, 45, 60, 65, 70, 75, 80, 85, 90, or 95, or ranges thereof, though higher or lower values are contemplated. Each of the foregoing numbers can be preceded by the word "about," "at least about," "less than about," or "more than about," and any of the foregoing numbers can be used singly to describe an open-ended range or in combination to describe a close-ended range. Total solids content of the acetoacetoxy-functionalized polymer is determined by ASTM D2369-92.

As described above, the acetoacetoxy-functionalized polymer includes first monomers comprising at least one acetoacetoxy-functionalized acrylate monomer or acetoacetoxy-functionalized methacrylate monomer. Suitable acetoacetoxy-functionalized acrylate monomers or acetoacetoxy-functionalized methacrylate monomers include acetoacetic vinyl or allyl esters or diesters of the formula (I):

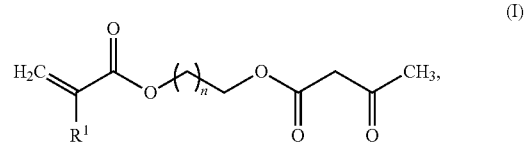

wherein:
R$^1$ is methyl (CH$_3$) or hydrogen; and
n is a number from 1 to 6, such as from 1 to 4.

Suitable acetoacetoxy-functionalized acrylate monomers or acetoacetoxy-functionalized methacrylate monomers of formula (II) include, for example, acetoacetic acid vinyl ester, acetoacetic acid allyl ester, or acetoacetic acid esters of β-hydroxyethyl acrylate or methacrylate or hydroxypropylacrylate or methacrylate. In some examples, the acetoacetoxy-functionalized acrylate monomers or acetoacetoxy-functionalized methacrylate monomers of formula (II) includes acetoacetoxy ethyl methacrylate (AAEM). One or more acetoacetoxy-functionalized acrylate monomers or acetoacetoxy-functionalized methacrylate monomers can be utilized in compositions described herein.

The acetoacetoxy-functionalized polymer includes second monomers that are different from the first monomers. One or more second monomers can be utilized in compositions described herein. Such second monomers include acrylate monomers or methacrylate monomers such as alkyl acrylate monomers or alkyl methacrylate monomers. Suitable alkyl acrylate monomers or alkyl methacrylate monomers, as the one or more second monomers, useful with compositions described herein include those having the general formula (II):

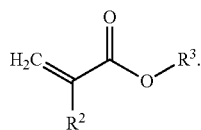

(II)

$R^2$ of formula (II) is methyl ($CH_3$) or hydrogen. $R^3$ of formula (II) has any suitable number of carbon atoms such as from 1 to 100 carbon atoms, such as from 2 to 50 carbon atoms, such as from 3 to 30 carbon atoms, such as from 6 to 24 carbon atoms, such as from 9 to 20 carbon atoms, such as from such as from 12 to 14 carbon atoms or 18 to 22 carbon atoms. In some embodiments, the number of carbon atoms in $R^3$ of formula (II) can be 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30. Each of the foregoing numbers can be preceded by the word "about," "at least about," "less than about," or "more than about," and any of the foregoing numbers can be used singly to describe an open-ended range or in combination to describe a close-ended range. $R^3$ of formula (II) can be unsubstituted or substituted, linear or branched, saturated or unsaturated, cyclic or acyclic. Regarding saturation, $R^3$ of formula (II) can be fully saturated, partially unsaturated, or fully unsaturated. Regarding saturation, $R^3$ of formula (II) can be fully saturated, partially unsaturated, or fully unsaturated.

An unsubstituted R group refers to an R group that consists of hydrogen and carbon atoms only. A substituted R group refers to an R group where at least one hydrogen of the R group has been substituted with at least one heteroatom or heteroatom-containing group, such as one or more elements from Group 13-17 of the periodic table of the elements, such as halogen (F, Cl, Br, or I), O, N, Se, Te, P, As, Sb, S, B, Si, Ge, Sn, Pb, and the like, such as C(O)R*, C(C)NR*$_2$, C(O)OR*, NR*$_2$, OR*, SeR*, TeR*, PR*$_2$, AsR*$_2$, SbR*$_2$, SR*, SO$_x$ (where x=2 or 3), BR*$_2$, SiR*$_3$, GeR*$_3$, SnR*$_3$, PbR*$_3$, and the like, where R* is, independently, hydrogen or hydrocarbyl, or where at least one heteroatom has been inserted within the R group. "Hydrocarbyl" refers to a group consisting of hydrogen and carbon atoms only.

Illustrative, but non-limiting examples, of alkyl acrylate monomers or alkyl methacrylate monomers of formula (II) include methyl acrylate, methyl methacrylate, ethyl acrylate, ethyl methacrylate, propyl acrylate, propyl methacrylate, butyl acrylate, butyl methacrylate, pentyl acrylate, pentyl methacrylate, n-hexyl acrylate, hexyl methacrylate, heptyl acrylate, heptyl methacrylate, n-octyl acrylate, n-octyl methacrylate, ethyl-2-hexyl acrylate, ethyl-2-hexyl methacrylate, isooctyl acrylate, isooctyl methacrylate, nonyl acrylate, nonyl methacrylate, n-decyl acrylate, n-decyl methacrylate, isodecyl acrylate, isodecyl methacrylate, undecyl acrylate, undecyl methacrylate, n-dodecyl acrylate, n-dodecyl methacrylate, tridecyl acrylate, tridecyl methacrylate, tetradecyl acrylate, tetradecyl methacrylate, pentadecyl acrylate, pentadecyl methacrylate, hexadecyl acrylate, hexadecyl methacrylate, heptadecyl acrylate, heptadecyl methacrylate, octadecyl acrylate, octadecyl methacrylate, nonadecyl acrylate, nonadecyl methacrylate, icosadecyl acrylate, icosadecyl methacrylate, henicosyl acrylate, henicosyl methacrylate, tricosyl acrylate, tricosyl methacrylate, or combinations thereof.

In some embodiments, $R^3$ of formula (II) has 1 to 12 carbons, such as from 1 to 6 carbons, such as from 1 to 4.

In at least one embodiment, one or more second monomers of formula (II) can include methyl methacrylate, butyl acrylate, methyl acrylate, butyl methacrylate, or combinations thereof.

In some embodiments, the one or more second monomers optionally includes one or more monomers formed from vinyl esters of organic carboxylic acids and the acid moiety of which contains 1 to 30 carbon atoms, such as 1 to 20 carbon atoms, for example, vinyl acetate, vinyl propionate, vinyl butyrate, vinyl isobutyrate, isononanoic acid vinyl ester and vinyl esters of branched monocarboxylic acids having up to 20 carbon atoms, such as pivalic acid vinyl ester and versatic acid vinyl ester, such as vinyl neodecanoate (CAS Number 51000-52-3); esters of acrylic acid or methacrylic acid having from 1 to 30 carbon atoms, such as 1 to 20 carbon atoms in the alcohol moiety, for example, ethyl acrylate, isopropyl acrylate, butyl acrylate, 2-ethylhexyl acrylate, methylmethacrylate, butyl methacrylate. Other second monomers that can be used to form the acetoacetoxy-functionalized polymer include aromatic, aliphatic, 6-unsaturated hydrocarbons, or combinations thereof, such as an alpha-olefin such as $C_2$ to $C_{40}$ alpha-olefins such as ethylene, propylene, styrene, vinyltoluene. Alpha-olefin monomers can be selected from the group consisting of ethylene, propylene, 1-butene, 1-pentene, 1-hexene, 1-heptene, 1-octene, 4-methylpent-1-ene, I-nonene, 1-decene, 1-undecene, 1-dodecene, 1-hexadecene, and the like, and any combination thereof, such as 1-butene, 1-hexene, 1-octene, and combinations thereof. In some embodiments, the second monomers can include a polyene such as isoprene, chloroprene, butadiene, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, or combinations thereof.

Other second monomers include a vinyl halide monomer such as vinyl chloride; an unsaturated nitrile monomer such as acrylonitrile; a diester of a carboxylic acid monomer such as diesters of maleic acid or fumaric acid, for example, dibutyl maleate or dibutyl fumarate; alpha, beta-unsaturated carboxylic acid monomer such as acrylic, methacrylic, crotonic, maleic or fumaric acids and derivatives thereof, for example, alpha, beta-unsaturated amide monomer such as acrylamide or methacrylamide. More than one second monomer can be utilized to form the acetoacetoxy-functionalized polymer of the compositions described herein.

The acetoacetoxy-functionalized polymer includes acetoacetoxy-functionalized monomer units (corresponding to first monomers after polymerization) and co-monomer units (corresponding to second monomers after polymerization). In these and other embodiments, the acetoacetoxy functionalized polymer can have the following characteristics:

(a) An amount of acetoacetoxy-functionalized monomer units in the acetoacetoxy-functionalized polymer can be from about 0.1 wt % to about 50 wt %, such as from about 1 wt % to about 50 wt %, such as from about 5 wt % to about 40 wt %, such as from about 10 wt % to about 30 wt %, such as from about 15 wt % to about 25 wt %, based on a total weight percent of the acetoacetoxy-functionalized polymer. In some embodiments, a total amount, in weight percent (wt %), of the one or more acetoacetoxy-functionalized acrylate monomers or acetoacetoxy-functionalized methacrylate monomers (first monomers) in the acetoacetoxy-functionalized polymer, based on a total weight percent of the acetoacetoxy-functionalized polymer can be 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

An amount of co-monomer units in the acetoacetoxy-functionalized polymer can be from about 50 wt % to about 99.9 wt %, such as from about 50 wt % to about 99 wt %, such as from about 60 wt % to about 95 wt %, such as from about 70 wt % to about 90 wt %, such as from about 75 wt % to about 85 wt %, based on a total weight percent of the acetoacetoxy-functionalized polymer. In some embodiments, a total amount (wt %) of the one or more second monomers in the acetoacetoxy-functionalized polymer, based on the total weight percent of the acetoacetoxy-functionalized polymer can be 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, 99.9, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

The acetoacetoxy-functionalized polymers can be made by mixing the one or more first monomers, one or more second monomers, or combinations thereof, with an initiator. Suitable initiators include, but are not limited to free radical initiators, such as peroxides. Suitable peroxides include 1,1-bis(tert-amylperoxy)cyclohexane (CAS #15667-10-4), 1,1-bis(tert-butylperoxy)cyclohexane (CAS #3006-86-8), or combinations thereof. Other suitable peroxides include benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, tetralin hydroperoxide, phenylcyclohexane hydroperoxide, tertiary butyl peracetate, dicumyl peroxide, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobisisobutyrate, 2,2'-azobis(2,4-dimethylvaleronitrile), 2,2'-azobisisobutyramide, and the like. Other initiators are contemplated. One or more initiators can be used with compositions described herein. The initiator may be used as a solution or suspension in a suitable solvent such as mineral spirits, at desired concentrations.

The acetoacetoxy-functionalized polymer can be made by feeding one or more first monomers, one or more second monomers, and an initiator to a reactor charged with solvent and reacted under effective conditions to form the acetoacetoxy-functionalized polymer. The conditions can include a reactor temperature that is from about 50° C. to about 200° C., and can include a reaction time of about 5 minutes to about 24 hours. Other temperatures and times are contemplated and can be different depending on, for example, the monomers, solvent, or initiator utilized for the polymerization. Conditions effective to form the acetoacetoxy-functionalized polymer can include stirring, mixing, agitation, or combinations thereof. Conditions can optionally include utilizing a non-reactive gas, such as $N_2$, Ar, or combinations thereof. For example, a reaction mixture comprising monomers, solvent, and initiator these or other non-reactive gases to degas various components or otherwise remove oxygen from the reaction mixture.

Suitable solvents utilized to form the acetoacetoxy-functionalized polymer include an organic solvent. Organic solvents can include, but are not limited to alcohols; aliphatic, naphthenic and aromatic hydrocarbons; ethers; esters; and ketones. Illustrative, but non-limiting, examples of organic solvents include hexane, heptane, octane, methyl cyclohexane, xylene, toluene, ethyl alcohol, isopropyl alcohol, butyl alcohol, the monomethyl ether of diethylene glycol, ethylene glycol of monobutyl ether, tetrahydrofuryl alcohol, ethylene glycol monomethyl ether, ethyl acetate, isopropyl acetate, butyl acetate, amyl acetate, acetone, methyl ethyl ketone, methyl isobutyl ketone, diisobutyl ketone, and combinations thereof. Other solvents are contemplated. In some embodiments, the resin composition is free or substantially free of water.

The resin compositions described herein further include one or more epoxy resin components. Each of the one or more epoxy resin components includes an epoxy resin. The epoxy resin may also be monomeric or polymeric. Epoxy resins are those compounds containing at least one vicinal epoxy group. The epoxy resin may be saturated or unsaturated, aliphatic, cycloaliphatic, aromatic or heterocyclic and may be substituted. In some examples, the choice of epoxy resin is based on, for example, the UV resistance properties desired.

The epoxy resin utilized may be, for example, an epoxy resin or a combination of epoxy resins prepared from an epihalohydrin and a phenol or a phenol type compound, prepared from an epihalohydrin and an amine, prepared from an epihalohydrin and an a carboxylic acid, or prepared from the oxidation of unsaturated compounds.

Suitable epoxy resins useful for embodiments described herein can include non-aromatic epoxy resins. The epoxy resins can contain more than one and in some embodiments, two 1,2-epoxy groups per molecule. In some embodiments, the epoxy resin may be liquid rather than solid. In at least one embodiment, the epoxy resin has an epoxide equivalent weight of about 100 to about 5,000, such as from about 100 to about 2,000, such as from about 100 to 500, as determined by titration methods described in ASTM D1652.

In some embodiments, the epoxy resins may be non-aromatic hydrogenated cyclohexane dimethanol and diglycidyl ethers of hydrogenated Bisphenol A-type epoxy resin, such as hydrogenated bisphenol A-epichlorohydrin epoxy resin, cyclohexane dimethanol diglycidylether, and cycloaliphatic epoxy resin.

In at least one embodiment, the epoxy resins utilized in the resin compositions of the present disclosure include those resins produced from an epihalohydrin and a phenol or a phenol-type compound. The phenol-type compound includes compounds having an average of more than one aromatic hydroxyl group per molecule. Examples of phenol-type compounds include dihydroxy phenols, biphenols, bisphenols, halogenated biphenols, halogenated bisphenols, hydrogenated bisphenols, alkylated biphenols, alkylated bisphenols, trisphenols, phenol-aldehyde resins, novolac resins (the reaction product of phenols and simple aldehydes, such as formaldehyde), halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, or combinations thereof.

In some embodiments, the epoxy resin utilized in the compositions described herein include those resins produced from an epihalohydrin and bisphenols, halogenated bisphenols, hydrogenated bisphenols, novolac resins, and polyalkylene glycols, or combinations thereof.

In at least one embodiment, the epoxy resin compounds utilized in the compositions of the disclosure preferably include those resins produced from an epihalohydrin and resorcinol, catechol, hydroquinone, biphenol, bisphenol A, bisphenol AP (1,1-bis(4-hydroxyphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A, or combinations thereof.

In some embodiments, the epoxy resins utilized in the compositions of the present disclosure include those resins produced from an epihalohydrin and an amine. Suitable amines include diaminodiphenylmethane, aminophenol, xylene diamine, anilines, and the like, or combinations thereof.

In at least one embodiment, the epoxy resin utilized in the compositions of the present disclosure can include those resins produced from an epihalohydrin and a carboxylic acid. Suitable carboxylic acids include phthalic acid, isophthalic acid, terephthalic acid, tetrahydrohydrophthalic acid, hexahydrophthalic acid, endomethylenetetrahydrophthalic acid, isophthalic acid, methylhexahydrophthalic acid, and the like or combinations thereof.

In some embodiments, the epoxy resin compounds utilized in the compositions of the disclosure include those resins produced from an epihalohydrin and compounds having at least one aliphatic hydroxyl group. In such embodiments, it is understood that such resin compositions produced contain an average of more than one aliphatic hydroxyl groups. Examples of compounds having at least one aliphatic hydroxyl group per molecule include aliphatic alcohols, aliphatic diols, polyether diols, polyether triols, polyether tetrols, any combination thereof and the like. Also suitable are the alkylene oxide adducts of compounds containing at least one aromatic hydroxyl group. In this embodiment, it is understood that such resin compositions produced contain an average of more than one aromatic hydroxyl groups. Examples of oxide adducts of compounds containing at least one aromatic hydroxyl group per molecule include ethylene oxide, propylene oxide, or butylene oxide adducts of dihydroxy phenols, biphenols, bisphenols, halogenated bisphenols, alkylated bisphenols, trisphenols, phenol-aldehyde novolac resins, halogenated phenol-aldehyde novolac resins, alkylated phenol-aldehyde novolac resins, hydrocarbon-phenol resins, hydrocarbon-halogenated phenol resins, or hydrocarbon-alkylated phenol resins, or combinations thereof.

The epoxy resin, in some embodiments, can refer to an advanced epoxy resin which is the reaction product of one or more epoxy resins components, as described above, with one or more phenol type compounds and/or one or more compounds having an average of more than one aliphatic hydroxyl group per molecule as described above. Alternatively, the epoxy resin may be reacted with a carboxyl substituted hydrocarbon. A carboxyl substituted hydrocarbon is described herein as a compound having a hydrocarbon backbone, such as a $C_1$-$C_{40}$ hydrocarbon backbone, and one or more carboxyl moieties, such as more than one, such as two. The $C_1$-$C_{40}$ hydrocarbon backbone may be a linear- or branched-chain alkane or alkene, optionally containing oxygen. Fatty acids and fatty acid dimers are among the useful carboxylic acid substituted hydrocarbons. Included in the fatty acids are caproic acid, caprylic acid, capric acid, octanoic acid, pivalic acid, neodecanoic acid, decanoic acid, lauric acid, myristic acid, palmitic acid, stearic acid, palmitoleic acid, oleic acid, linoleic acid, linolenic acid, erucic acid, pentadecanoic acid, margaric acid, arachidic acid, and dimers thereof.

In at least one embodiment, the epoxy resin is a reaction product of a polyepoxide and a compound containing more than one isocyanate moiety or a polyisocyanate. The epoxy resin produced in such a reaction can be an epoxy-terminated polyoxazolidone.

In some embodiments, the epoxy resin includes cyclohexanol, 4,4'-(1-methylethylidene)bis-, polymer with 2-(chloromethyl)oxirane (CAS Number 30583-72-3).

The resin compositions described herein further include a curing agent. Curing agents useful with compositions described herein include, but are not limited to, aliphatic polyamines, cycloaliphatic amines, aromatic amines, Mannich bases, ketimines, oxazolines, amidoamines, and modified polyamine resins prepared by reacting aliphatic or cycloaliphatic polyamines with compounds containing functional groups which react with the amine group, such as glycidyl ether-containing or carboxy-containing compounds. Reaction products of polyamines with glycidyl ether-group containing compounds are known as "polyamine-epoxy adducts." Reaction products of dicarboxylic acids and polyamines are known as "polyamide resins." The latter are usually prepared by condensation of the dicarboxylic acid with excess amounts of polyalkylene polyamines. Polyamides based on dicarboxylic acids having more than 10 carbon atoms, particularly those based on $C_{36}$ dicarboxylic acids, are preferred because of the water resistance and flexibility of the resulting coatings. Examples of suitable polyamines useful with the method of the application include, but are not limited to, 1,3-bis(aminomethyl) cyclohexane, diethylenetriamine, triethylenetetramine, hexamethylenediamine, trimethylhexamethylenediamine, tetraethylenepentaamine, N,N'-dimethylpropylenediamine, 1,3-bis(4-amino-3-methylcyclohexyl)methane, bis(p-aminocyclohexyl)methane, 2,2-bis(4-aminocyclohexyl)propane, 3,5,5-trimethyl-3-(aminomethyl)-cyclohexylamine, N-aminoethlpiperazine, m-phenylenediamine, p-phenylenediamine, bis(p-aminophenyl)methane, bis(p-aminophenyl) sulfone, m-xylylenediamine, 1,2-diaminocyclohexane, 1,4-diaminocyclohexane, 1,4-bis(aminomethyl)cyclohexane, and combinations thereof.

In some embodiments, the curing agent includes a polyamine of formula (IVa):

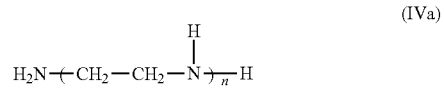

(IVa)

wherein:

n of formula (IVa) is 1, 2, 3, 4, 5, or 6.

Illustrative, but non-limiting examples, of the polyamine of formula (IVa) include diethylene triamine, ethylene diamine, triethylene diamine, hydrazine, or combinations thereof.

In some embodiments, the curing agent can include polyetheramine compounds. Polyetheramine compounds have several general formulas. One such formula is:

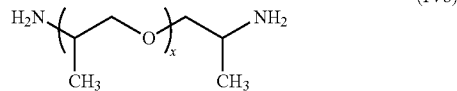

wherein:
x of formula (IVb) is from about 2.5 to about 68, such as from about 2.5 to about 6.1.

Another general formula for polyetheramines is formula (IVc):

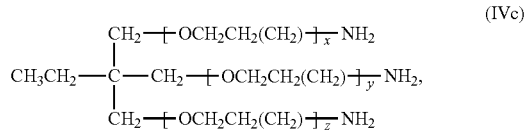

wherein:
x+y+z of formula (IVc) is an integer ranging from about 5 to about 85, such as from about 15 to about 60, such as from about 20 to about 40.

Other general formulas for polyetheramines include formula (IVd):

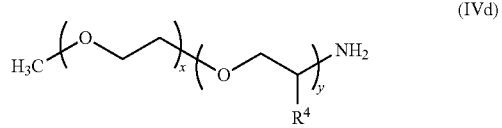

wherein:
$R^4$ of formula (IVd) is a hydrogen atom (H) for ethylene oxide (EO) and $R^4$ is $CH_3$ for propylene oxide (PO);
x of formula (IVd) is from about 1 to about 40; and
y of formula (IVd) is from about 1 to about 40.

In some examples of formula (IVd), x=1 when y=9, x=19 when y=3, or x=6 when y=29-35. Other combinations are contemplated. The PO/EO ratio for formula (IVd) may be from about 9:1 to about 10:31, such as about 9:1, about 3:19, about 29:6, or about 10:31.

Other general formulas for polyetheramines include formula (IVe):

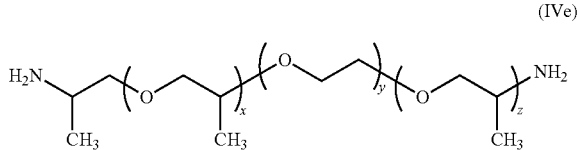

wherein:
x+z of formula (IVe) is from about 1.2 to about 6; and
y of formula (IVe) is from about 2 to about 39.

Examples of suitable polyamines useful with compositions described herein include, but are not limited to, 1,3-bis(aminomethyl)cyclohexane, diethylene triamine, triethylenetetraamine, hexamethylenediamine, trimethylhexamethylene diamine, tetraethylene pentaamine, N,N'-dimethylpropylenediamine, 1,3-bis(4-amino-3-methylcyclohexyl)methane, bis(p-aminocyclohexyl) methane, 2,2-bis(4-aminocyclohexyl)propane, 3,5,5-trimethyl-3-(aminomethyl)-cyclohexylamine, N-aminoethyl-piperazine, m-phenylenediamine, p-phenylenediamine, bis(p-aminophenyl)methane, bis(p-aminophenyl)sulfone, m-xylylenediamine, 1,2-diaminocyclohexane, 1,4-diaminocyclohexane, 1,4-bis(aminomethyl)cyclohexane, and combinations thereof.

Other suitable polyamines include any suitable amine functionalized polymer including, but not limited to, aminosilanes, amine-diacid adducts (industrially known as polyamidoamines), and amine-epoxy adducts.

Examples of suitable polyamines include the following polyetheramines: polyoxypropylenediamine with a molecular weight of about 230 (x is 2.5 for formula (IVb)), polyoxypropylenediamine with a molecular weight of about 430 (x is 6.1 for formula (IVb)), and combinations thereof.

The curing agent can include one or more of any of the aforementioned compounds, such as one or more polyamines. A weight average molecular weight (Mw) of the one or more polyamines suitable as a curing agent can be from about 15 g/mol to about 2000 g/mol, such as from about 25 g/mol to about 1000 g/mol, such as from about 35 g/mol to about 500 g/mol. In at least one embodiment, the Mw (g/mol) of the one or more polyamines is 15, 25, 50, 100, 150, 200, 250, 300, 350, 400, 450, 500, 550, 600, 650, 700, 750, 800, 850, 900, 950, or 1000, or ranges thereof, though higher or lower values are contemplated. Each of the foregoing numbers can be preceded by the word "about," "at least about," "less than about," or "more than about," and any of the foregoing numbers can be used singly to describe an open-ended range or in combination to describe a close-ended range. The Mw is determined as described in the Examples.

Besides the acetoacetoxy-functionalized polymer, the epoxy resin, and the curing agent, the resin compositions described herein can include other components. Such components include one or more solvents, one or more additives, or combinations thereof. Suitable solvents include an organic solvent. Organic solvents can include, but are not limited to alcohols; aliphatic, naphthenic and aromatic hydrocarbons; ethers; esters; and ketones. Illustrative, but non-limiting, examples of organic solvents include hexane, heptane, octane, methyl cyclohexane, xylene, toluene, ethyl alcohol, isopropyl alcohol, butyl alcohol, the monomethyl ether of diethylene glycol, ethylene glycol of monobutyl ether, tetrahydrofuryl alcohol, ethylene glycol monomethyl ether, ethyl acetate, isopropyl acetate, butyl acetate, amyl acetate, acetone, methyl ethyl ketone, methyl isobutyl ketone, diisobutyl ketone, and combinations thereof. Other solvents are contemplated. In some embodiments, the resin composition is free or substantially free of water. In some embodiments, the organic solvent includes n-butanol, toluene, xylene, or mixtures thereof.

Suitable additives known in the art can be used with the resin compositions described herein. Such additives include, but are not limited to accelerators; fillers and extenders, such as silica, mica, quartz, cryolite, Portland cement, limestone, atomized alumina, barytes, talc, zinc powder, pyrophyllite, clay, diatomaceous earth; pigments, such as titanium dioxide, red lead, basic lead silica chromate, basic zinc chromate, zinc, zinc oxide, lead, barium chromate, strontium chromate, calcium plumbate, barium metaborate, calcium molybdate, strontium molybdate, and zinc molybdate; and resinous modifiers, such as phenolic resins, urea resins, melamine resins, acrylic resins, polyester resins, vinyl resins, bituminous resins, and polystyrene; surfactants; UV absorbers; and combinations thereof. Other additives are contemplated.

The amount of the acetoacetoxy-functionalized polymer or monomers used to form it, epoxy resin component or monomers used to form the epoxy resin component, curing agent, among other components (such as solvent and initiator) can be utilized to define the molecular structure, chemical properties, and physical properties of the resin composition.

A total amount of the one or more acetoacetoxy-functionalized acrylate monomers or acetoacetoxy-functionalized methacrylate monomers (first monomers) in the acetoacetoxy-functionalized polymer can be from about 0.1 wt % to about 50 wt %, such as from about 1 wt % to about 50 wt %, such as from about 5 wt % to about 40 wt %, such as from about 10 wt % to about 30 wt %, such as from about 15 wt % to about 25 wt %, based on a total weight percent of the acetoacetoxy-functionalized polymer. In some embodiments, a total amount, in weight percent (wt %), of the one or more acetoacetoxy-functionalized acrylate monomers or acetoacetoxy-functionalized methacrylate monomers (first monomers) in the acetoacetoxy-functionalized polymer, based on a total weight percent of the acetoacetoxy-functionalized polymer can be 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

A total amount of the one or more second monomers in the acetoacetoxy-functionalized polymer can be from about 50 wt % to about 99.9 wt %, such as from about 50 wt % to about 99 wt %, such as from about 60 wt % to about 95 wt %, such as from about 70 wt % to about 90 wt %, such as from about 75 wt % to about 85 wt %, based on a total weight percent of the acetoacetoxy-functionalized polymer. In some embodiments, a total amount (wt %) of the one or more second monomers in the acetoacetoxy-functionalized polymer, based on the total weight percent of the acetoacetoxy-functionalized polymer can be 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, 99.9, or ranges thereof, though higher or lower amounts of the one or more second monomers are contemplated. Each of the foregoing numbers can be preceded by the word "about," "at least about," "less than about," or "more than about," and any of the foregoing numbers can be used singly to describe an open-ended range or in combination to describe a close-ended range.

The wt % of each component in the acetoacetoxy-functionalized polymer is based on a percent solid weight basis (% solid weight basis). The total wt % of the acetoacetoxy-functionalized polymer described herein does not exceed 100 wt %.

An amount of the one or more initiators used to form the acetoacetoxy-functionalized polymer, or used in compositions described herein, can be from about 0.1 wt % to about 2 wt %, such as from about 0.5 wt % to about 1.5 wt %, based on a total weight percent of the one or more first monomers, one or more second monomers, and one or more initiators. In some embodiments, a total amount (wt %) of the one or more initiators, based on the total weight percent of the one or more first monomers, one or more second monomers, and one or more initiators can be 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2, or ranges thereof, though higher or lower amounts of the one or more initiators are contemplated. Each of the foregoing numbers can be preceded by the word "about," "at least about," "less than about," or "more than about," and any of the foregoing numbers can be used singly to describe an open-ended range or in combination to describe a close-ended range.

In some examples, the acetoacetoxy-functionalized polymer can be formed from the following non-limiting mixture:
(a) About 1 wt % to about 50 wt %, such as about 10 wt % to about 30 wt %, of first monomers comprising acetoacetoxy ethyl methacrylate (AAEM);
(b) About 50 wt % to about 99 wt %, such as from about 70 wt % to about 90 wt %, of second monomers comprising methyl methacrylate (MMA), butyl acrylate (BA), isobornyl methacrylate (IBOMA), styrene, vinyl neodecanoate, or combinations thereof; and
(c) About 0.1 to 2 wt % of a peroxide initiator, where the wt % of each component is based on the total weight of the first monomers, second monomers, and initiator, and the total wt % not to exceed 100 wt %. The wt % of each of the first monomers, second monomers, and initiator can be those weight percentages described above.

In some embodiments, resin compositions include an acetoacetoxy-functionalized polymer, an epoxy resin component, and a curing agent. Such resin compositions can be formulated with the following components, where the wt % of each component is based on % solid weight basis, and a total wt % of the resin composition not to exceed 100 wt %:
(a) An amount of the acetoacetoxy-functionalized polymer in the resin composition is from about 1 wt % to about 50 wt %, such as from about 5 wt % to about 30 wt %, such as from about 10 wt % to about 20 wt %, based on the resin composition, the total weight of the resin composition not to exceed 100 wt % (solids basis). In at least one embodiment, the amount (wt %, solids basis) of the acetoacetoxy-functionalized polymer in the resin composition is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.
(b) An amount of the epoxy resin in the resin composition can be from about 25 wt % to about 99 wt %, such as from about 30 wt % to about 80 wt %, such as from about 40 wt % to about 70 wt %, based on the total weight of the resin composition. In at least one embodiment, the amount (wt %, solids basis) of the epoxy resin in the resin composition is 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.
  (c) An amount of curing agent in the resin composition can be from about 1 wt % to about 67 wt %, such as from about 5 wt % to about 60 wt %, such as from about 10 wt % to about 50 wt %, based on the total weight of the resin composition. In at least one embodiment, the amount (wt %, solids basis) of the epoxy resin in the resin composition is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or 67, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

In some embodiments, the resin composition can further include a solvent such as those solvents described herein. The amount of solvent in the resin composition can be from about 0 wt % to about 50 wt %, such as from about 10 wt % to about 40 wt %, such as from about 20 wt % to about 30 wt %, based on the total weight of the resin composition.

In some embodiments, an epoxy resin polymerization product is formed from a resin composition described herein. The resin compositions described herein can be applied by suitable methods such as brush-coating, dip coating, spray coating, air coating, combinations thereof, among others.

Curing can generally be carried out by exposure of the applied composition to ambient conditions for a suitable period such as 30 minutes to one week though other periods are contemplated. Typically, curing can be carried out according to ASTM D5895. With respect to the dry-through stage (or Stage IV) of ASTM D5895, the curing conditions are 25° C., 50% relative humidity.

In some embodiments, the resin compositions described herein can have one or more of the following non-limiting properties:
  (a) A pencil hardness (1 day) of the composition can be from about 6B to about H, such as from about 2B to about HB, though other values are contemplated. Pencil hardness is determined as described in the Examples.
  (b) A methyl ethyl ketone (MEK) resistance (7 days) of the composition can be about 150 double-rubs or more, such as about 200 double-rubs or more, though other values are contemplated. MEK resistance is determined as described in the Examples.
  (c) An impact resistance (direct) of the composition can be from about 4 to about 160, such as from about 40 to about 120, though other values are contemplated. Impact resistance (direct) is determined as described in the Examples.
  (d) An impact resistance (reverse) of the composition can be from about 4 in-lbs to about 160 in-lbs, such as from about 20 in-lbs to about 80 in-lbs, though other values are contemplated. Impact resistance (reverse) is determined as described in the Examples.
  (e) An adhesion of the composition to CRS (x-cut) can be any value from 0A to 5A. The adhesion by x-cut is determined as described in the Examples. CRS refers to cold-rolled steel (QD-46 panels, smooth finish steel panels).
  (g) An adhesion of the composition to CRS (cross-cut) can be any value from 0A to 5B. The adhesion by cross-cut is determined as described in the Examples.

The resin compositions described herein can be used as, for example, coatings, binders, paints, adhesives, sealants, among other applications. Accordingly, and in some embodiments, the present disclosure also relates to such systems such as coating systems, such as coating systems and coating formulations made of two or more components, commonly referred to as "2K systems" or "2K coating formulations." The first and second components are mixed together just before application to a resin. The terms "coating system", "2K system", and "2K coating formulation" are used interchangeably such that reference to one includes reference to the other. For example, reference to "coating system" includes reference to "coating system", "2K coating formulation", and "2K system."

Coating systems of the present disclosure can include two or more components. The first component of the coating system can include an epoxy resin and an acetoacetoxy-functionalized polymer, such as those epoxy resins and acetoacetoxy-functionalized polymers described above. The second component can include a curing agent such as those curing agents described above. The coating system can be provided as a two-container system where, for example, a first container contains the first component, and the second container contains the second component.

In some embodiments, the first component of the coating system can include the acetoacetoxy-functionalized polymer in an amount that is from about 1 wt % to about 50 wt %, such as from 10 wt % to about 25 wt %, such as from 15 wt % to about 20 wt %, based on a total weight percent of the first component of the coating system, and the total weight percent of the first component not to exceed 100 wt %. In at least one embodiment, the amount (wt %, solids basis) of the acetoacetoxy-functionalized polymer in the first component of the coating system is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

In some embodiments, an amount (solids basis) of the epoxy resin in the first component of the coating system can be from about 50 wt % to about 90 wt %, such as from 60 wt % to about 80 wt %, such as from 65 wt % to about 75 wt %, such as from wt % to about wt %, based on the total weight percent of the first component of the coating system. In at least one embodiment, the amount (wt %, solids basis) of the epoxy resin in the first component of the coating system is 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

The wt % of the acetoacetoxy-functionalized polymer and the epoxy resin in the first component is based on wt % solid basis of the first component. Solvents and other components can be used with the first component. In such cases, the amount of acetoacetoxy-functionalized polymer and epoxy resin can be changed as desired.

In some embodiments of the coating system, the amount of first component comprising acetoacetoxy-functionalized polymer and the epoxy resin, and the amount of the second component comprising the curing agent can be varied. For such embodiments, a molar ratio of the first component to the second component is from about 80:20 to about 20:80, such as from about 70:30 to about 30:70, such as from about 60:40 to about 40:60, such as from about 55:45 to about 45:55, such as about 50:50. In some embodiments of the coating system, the molar ratio of the first component to the second component is from about 80:20, 70:30, 69:31, 68:32, 67:33, 66:34, 65:35, 64:36, 63:37, 62:38, 61:39, 60:40, 59:41, 58:42, 57:43, 56:44, 55:45, 54:46, 53:47, 52:48, 51:49, 50:50, 49:51, 48:52, 47:53, 46:54, 45:55, 44:56, 43:57, 42:58, 41:59, or 40:60, or ranges thereof, though higher or lower molar ratios are contemplated. Each of the foregoing numbers can be preceded by the word "about," "at least about," "less than about," or "more than about," and any of the foregoing numbers can be used singly to describe an open-ended range or in combination to describe a close-ended range.

The molar ratio of the first component to the second component is based on functional equivalence (reactive groups present in each component). That is, the molar ratio refers to the molar quantities of (epoxy groups+acetoacetoxy groups):(active hydrogens located on the amine groups of the curing agent).

As discussed above, the coating system can include two or more components where the first component includes the acetoacetoxy-functionalized polymer and the epoxy resin, and the second component includes the curing agent. In some embodiments, the coating system (a total amount of the first and second component) can have the following formulation, where the wt % of each component is based on % solid weight basis, and a total wt % of the resin composition not to exceed 100 wt %:

(a) An amount of the acetoacetoxy-functionalized polymer in the coating system is from about 1 wt % to about 50 wt %, such as from about 5 wt % to about 30 wt %, such as from about 10 wt % to about 20 wt %, based on a total weight of coating system, the total weight of the coating system not to exceed 100 wt %. In at least one embodiment, the amount (wt %, solids basis) of the acetoacetoxy-functionalized polymer in the coating system is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

(b) An amount of the epoxy resin in the coating system can be from about 25 wt % to about 99 wt %, such as from about 30 wt % to about 80 wt %, such as from about 40 wt % to about 70 wt %, based on the total weight of coating system. In at least one embodiment, the amount (wt %, solids basis) of the epoxy resin in the coating system is 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

(c) An amount of curing agent in the coating system can be from about 1 wt % to about 67 wt %, such as from about 5 wt % to about 60 wt %, such as from about 10 wt % to about 50 wt %, based on the total weight of coating system. In at least one embodiment, the amount (wt %, solids basis) of the epoxy resin in the coating system is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or 67, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

Other components can be used with the first component, the second component, or as a third component of the coating system. In such cases, the amount of acetoacetoxy-functionalized polymer, epoxy resin, and curing agent can be changed as desired.

Any suitable solvents, additives, or additional components, such as those described above, can be included with the first component, the second component, or both. Additionally, or alternatively, any suitable solvents, additives, or additional components, such as those described above, can be included as a separate component.

When the components of the coating system are mixed, a coating composition is formed. Similar to the resin compositions described herein, an epoxy resin polymerization product is formed after mixing the components of the coating system. The coating composition can be applied by suitable methods such as brush-coating, dip coating, spray coating, air coating, combinations thereof, among others.

Curing can generally be carried out by exposure of the applied composition to ambient conditions for a suitable period such as 30 minutes to one week though other periods are contemplated. Typically, curing can be carried out according to ASTM D5895. With respect to the dry-through stage (or Stage IV) of ASTM D5895, the curing conditions are 25° C., 50% relative humidity.

The coating composition can have the same or similar physical properties as those described above for the resin composition such as pencil hardness, MEK resistance, impact resistance (direct), impact resistance (reverse), mandrel bend, adhesion (x-cut), or adhesion (cross-cut).

Embodiments of the present disclosure also relate to uses of the resin compositions and coating compositions described herein. The compositions described herein can be used as coatings, binders, paints, adhesives, sealants, among other applications. For example, the compositions can be used in construction, with installation of concrete and cement, such as high-gloss concrete installations. Another use includes coating metals. Other end-use applications for the compositions described herein include, but are not limited to: cellulosic, lignocellulosic, and wood products; plastics; fabrics (wovens and non-wovens); and glass. The compositions can be used generally for producing composites, adhesives, insulation materials, shaped products, binders, laminates, among other articles and articles of manufacture.

The following examples are put forth so as to provide those of ordinary skill in the art with a complete disclosure and description of how to make and use embodiments of the present disclosure, and are not intended to limit the scope of embodiments of the present disclosure. Efforts have been made to ensure accuracy with respect to numbers used but some experimental errors and deviations should be accounted for.

EXAMPLES

Test Methods

Compositions described herein were subjected to a variety of tests. The rate of dry-film formation of the sample compositions was measured using a circular mechanical drying time recording device per ASTM D5895 (Circular Dry Time).

Assessment of the solvent resistance of the sample compositions was determined by methyl ethyl ketone (MEK) resistance using ASTM D5402. The MEK resistance of the composition was determined after 7 days of curing at 25° C.

The hardness of the sample compositions was determined by measuring pencil hardness in accordance with ASTM D1186. The pencil hardness was rated based on the scale provided in the ASTM standard. The pencil hardness of the composition is determined after 1 day (or 24 hours) of curing at 25° C.

The impact resistance (direct and reverse) of the sample compositions was determined using ASTM D2794. Impact resistance measures the resistance of the compositions to the effects of rapid deformation. This test involved applying organic coatings to suitable 24 gauges metal panels and dropping a standard weight from a certain distance to induce an indenter deforming the composition.

The adhesion of the sample compositions to a substrate was measured by tape test per ASTM D3359: Method A (X-cut) and Method B (cross-cut). The adhesion was rated based on the scale provided in the ASTM standard. The substrate used for the adhesion testing was cold-rolled steel (QD-46 panels, smooth finish steel panels).

The resistance of the sample compositions to cracking (flexibility) was determined by the mandrel bend test in accordance with ASTM D522.

The weight average molecular weight (Mw) of the acetoacetoxy-functionalized polymer, as well as the curing agent, were measured via Size Exclusion Chromotography using an Agilent 1100 High-Performance Liquid Chromatograph, commercially available from Agilent Technologies Inc., of Germany, equipped with multiple columns (PLgel Mixed-E from Polymer Laboratories) to ensure sufficient molecular weight resolution. The mobile phase used to transport the analyte through the columns was tetrahydrofuran at a rate of 1.0 ml/min. The concentration of particles eluted over time was constantly monitored via a refractive index detector. Narrow weight distribution polystyrene standards from Polymer Laboratories were used to calibrate the instrument.

The glass transition temperature ($T_g$) of the acetoacetoxy-functionalized polymer was calculated based on the Fox equation, shown as Equation 1. The Fox equation states that the reciprocal of the calculated glass transition temperature ($T_g$) of a mixture is equal to the Summation over each component of the weight fraction of each component ($w_i$) divided by its glass transition temperature ($T_{g,i}$) expressed in Kelvin:

$$\frac{1}{T_g} = \sum_i \frac{w_i}{T_{g,i}} \quad \text{(Eq. 1)}$$

Example Acetoacetoxy-Functionalized Polymer

An example acetoacetoxy-functionalized polymer was made according to the following non-limiting example. The amount in grams (g) is based on 1 liter (1 L) and reactor was placed under an atmosphere of nitrogen throughout the reaction. To a reactor was charged xylene (30 wt %, 120 g) and the reactor was heated to about 130° C. When the temperature inside the reactor reached about 130° C., a mixture of acetoacetoxy ethyl methacrylate monomer (AAEM, 20 wt %, 80 g), methyl methacrylate monomer (MMA, 50 wt %, 200 g), n-butyl acrylate monomer (BA), vinyl neodecanoate monomer (20 wt %, 80 g), and 1,1-bis(tert-amylperoxy)cyclohexane initiator (0.8 wt %, 3.2 g) was gradually pumped into the reactor in a continuous manner over a period of about 3 hours. The reactor temperature was controlled at about 130+5° C. during the addition of these monomers and initiator. After the three hours, an additional portion of 1,1-bis(tert-amylperoxy)cyclohexane initiator (0.8 wt %, 3.2 g) in xylene (15 wt %, 60 g) was added over a period of about 1 hour while maintaining the temperature at about 130° C. and the resultant mixture was allowed to react for an additional 30 minutes after all the initiator was added. Next, the mixture was allowed to cool such that the temperature inside the reactor was about 110° C., at which point an additional portion of xylene (33 wt %, 132 g) was added. Following sufficient reaction for the acetoacetoxy-functionalized polymer, the mixture was allowed to cool to about 60° C. The acetoacetoxy-functionalized polymer formed was a medium Tg liquid resin. The Tg of the acetoacetoxy-functionalized polymer was measured to be about 40° C. as calculated based on the Fox equation. The solids content of the acetoacetoxy-functionalized polymer was determined to be about 55.6%. The solids content was measured in accordance with ASTM D2369-92. Table 1 shows the example process recipe for the aforesaid procedure of forming the acetoacetoxy-functionalized polymer.

TABLE 1

| Operation | Ingredients | Amount (wt %) | Weight for 1 L (g) |
|---|---|---|---|
| 1. Initial reactor charge | xylene | 30 | 120 |
| 2. Monomers, solvent, and initiator feeding Reactor temperature: 130° C.; Step duration: 3 hours at 130° C.; Feeding time: all ingredients within 3 hours | AAEM | 20 | 80 |
| | MMA | 50 | 200 |
| | BA | 10 | 40 |
| | vinyl neodecanoate | 20 | 80 |
| | 1,1-bis(tert-amylperoxy)cyclohexane | 0.8 | 3.2 |
| 3. Post cooking Feeding in 1 hour while maintaining at 130° C. | 1,1-bis(tert-amylperoxy)cyclohexane | 0.8 | 3.2 |
| | Xylene | 15 | 60 |
| 4. Solvent Addition Adding at 110° C. | Xylene | 33 | 132 |

Example Compositions

The acetoacetoxy-functionalized polymer was blended, at various amounts, with an example epoxy resin (cyclohexanol, 4,4'-(1-methylethylidene)bis-, polymer with 2-(chloromethyl)oxirane (CAS Number 30583-72-3)). Other suitable epoxy resins can be utilized. Table 2A shows example properties of the various blends of the acetoacetoxy-functionalized polymer and the epoxy resin. The blends were made at ratios of epoxy resin (ER) to acetoacetoxy-functionalized polymer (AFP) of about 50:50, about 60:40, about 70:30, about 80:20, and about 90:10. After blending the ER and AFP, each sample was mixed with 1,3-bis(aminomethyl) cyclohexane at a 1:1 stoichiometry. Induction time was measured in units of minutes (min). The touch-dry time, tack-free time, and dry-through time were each measured in units of hours (h).

TABLE 2A

| Sample | Blend Ratio | Induction time, min | Touch-dry time, h | Tack-free time, h | Dry-through time, h |
|---|---|---|---|---|---|
| Ex. 1 | 100:0 ER:AFP | 30 | 5.5 | 10 | >24 |
| Ex. 2 | 0:100 ER:AFP | 0 | — | <0.5 | — |
| Ex. 3 | 50:50 ER:AFP | 0 | 0.5 | 1 | 8.5 |
| Ex. 4 | 60:40 ER:AFP | 0 | 1.5 | 8 | 11 |
| Ex. 5 | 70:30 ER:AFP | 0 | 3 | 5 | 6.5 |
| Ex. 6 | 80:20 ER:AFP | 0 | 4 | 7 | 9 |
| Ex. 7 | 90:10 ER:AFP | 0 | 4.5 | 8 | 14 |

The exemplary, non-limiting, data shown in Table 2A, illustrates that the induction time of the blends was significantly reduced compared to the epoxy resin alone. Induction time refers to a waiting period after mixing the two components of the coating. For conventional epoxy-polyamides, the induction time is typically 30-60 minutes, or even higher, after mixing before applying to a surface. Without the acetoacetoxy-functionalized polymer (Example 1), the induction time was determined to be about 30 minutes, which falls in line with conventional resins. In contrast, all example blends of the epoxy resin with the acetoacetoxy-functionalized polymer showed an induction time of about 0 min (Examples, 3-7), indicating that the material dried quickly enough and reacted quickly enough to not need an induction time.

The touch-dry time, tack-free time, and the dry-through time referred to in Table 2A are known, alternate names for the stages listed in ASTM D5895 (Circular Dry Time). The touch-dry time was also significantly reduced for the blends, proportionately to the amount of acetoacetoxy-functionalized polymer used in the blend. For example, the touch-dry time of the epoxy resin alone (Example 1) is about 5.5 hours, while larger amounts of acetoacetoxy-functionalized polymer as shown by Example 3 (50:50 blend; touch-dry time of about 0.5 h) compared to Example 7 (90:10 blend; touch-dry time of about 4.5 h). The excellent touch-dry time indicates that this stage of the drying is significantly reduced.

The tack-free time of all blends containing the acetoacetoxy-functionalized polymer were improved over the epoxy resin alone, decreasing from about 10 h (Example 1) to less than about 8. Here, for example, the tack-free time of the 50:50 blend (Example 3) was determined to be about 1 hour. Examples 4 and 7 showed the highest tack-free time of the blends containing acetoacetoxy-functionalized polymer, though each were significantly lower than the epoxy resin alone (Example 1). The dry-through time of all the blends containing the acetoacetoxy-functionalized polymer were also significantly improved over the epoxy resin alone, decreasing from a dry-through time of greater than about 24 h (Example 1) to less than about 14 h. Here, for example, the dry-through times of the 70:30 blend (Example 5) and the 50:50 blend (Example 3) were determined to have the lowest dry through times of about 6.5 h and about 8.5 hours respectively. Overall, the results presented in Table 2A indicated that the example compositions described herein are fast drying.

Example resin compositions shown in Table 2B were prepared. All resin compositions were made using an epoxy resin (cyclohexanol, 4,4'-(1-methylethylidene)bis-, polymer with 2-(chloromethyl)oxirane (CAS Number 30583-72-3)). Comparative Example 1 (C.Ex. 1) is the epoxy resin. Comparative Example 2 (C.Ex. 2) is a blend of the epoxy resin and a commercially available acetoacetate functional reactive diluent (K-FLEX XM-B301). Comparative Example 3 (C.Ex. 3) is a blend of the epoxy resin and a copolymer of glycidyl methacrylate (20%), methyl methacrylate (50%), butyl acrylate (5%), isobornyl methacrylate (9%), and vinyl neodecanoate (16%). Example 7 is a blend of the epoxy resin and an acetoacetoxy-functionalized polymer (10% AAEM in polymer). Example 8 is a blend of the epoxy resin and an acetoacetoxy-functionalized polymer (10% AAEM in polymer).

Each resin composition shown in Table 2B was then mixed with the curing agent, 1,3-bis(aminomethyl)cyclohexane (1,3-BAC), at a 1:1 stoichiometry. After mixing the resin compositions with the curing agent, the touch-dry time and dry-through times, as measured by ASTM D5895, were determined.

TABLE 2B

| Sample Resin Composition | Wt % acetoacetoxy groups in resin | Wt % acetoacetoxy-functionalized acrylic polymer | Wt % epoxy-functionalized acrylic polymer | Touch-dry Time (h) | Dry-through Time (h) |
|---|---|---|---|---|---|
| C. Ex. 1 | 0 | 0 | 0 | 5.5 | >24 |
| C. Ex. 2 | 5 | 0 | 0 | 4.5 | >24 |
| C. Ex. 3 | 0 | 0 | 25 | 3 | >24 |
| Ex. 7 | 2.5 | 12.5 | 0 | 6 | >24 |
| Ex. 8 | 4 | 12.5 | 0 | 1 | 10 |

In Table 2B, "wt % acetoacetoxy groups in resin" refers to the weight percent of the acetoacetoxy functional groups in the resin compositions prior to mixing with the curing agent. "Wt % epoxy-functionalized acrylic polymer" refers to the weight percent of epoxy-functionalized acrylic polymer in the resin compositions prior to mixing with the 1,3-BAC, and "wt % acetoacetoxy-functional acrylic polymer" refers to the weight percent of acetoacetoxy-functionalized acrylic polymer in the resin compositions prior to mixing with the 1,3-BAC. The epoxy-functionalized acrylic polymer has a similar molecular weight to the acetoacetoxy-functionalized acrylic polymer but without the acetoacetoxy-functionality.

The exemplary, non-limiting, data shown in Table 2B, illustrates that the compositions described herein are fast drying. The data in Table 2B also indicates that fast drying compositions have sufficient acetoacetoxy functionality in order to achieve decreased dry times compared to the comparative compositions. However, this quantity of acetoacetoxy functionality can be best delivered by way of an acetoacetoxy-functionalized acrylic polymer as seen in comparing the dry times of Comparative Example 2 versus Example 8. The superior drying properties of acetoacetoxy functionality versus epoxy functionality is also displayed with the data from Comparative Example 3, which has a higher loading of an epoxy-functional polymer than Example 8 (having acetoacetoxy-functionalized acrylic polymer), yet a significantly longer dry time.

Another example composition was prepared by mixing a first component (epoxy resin and acetoacetoxy-functionalized polymer) and a second component (curing agent). This example composition is a non-limiting example of the resin composition or the coating composition described herein. For this example, 1,3-bis(aminomethyl)cyclohexane (1,3-BAC) was chosen as the curing agent. Cyclohexanol, 4,4'-(1-methylethylidene)bis-, polymer with 2-(chloromethyl)oxirane was chosen as the epoxy resin (ER). However, other suitable curing agents and epoxy resins are contemplated. The weight percentages of each component of the example composition are shown in Table 3 and are based on the total weight of the resin composition. A comparative composition that included a first component (epoxy resin alone) and a second component (1,3-BAC). Properties of the example composition and the comparative composition are also shown in Table 3.

TABLE 3

|  | Example Composition | Comparative Composition |
|---|---|---|
| Amount of ER, wt % | 70 | 86 |
| Amount of AFP, wt % | 18 | — |
| Amount of 1,3-BAC, wt % | 12 | 14 |
| Total, wt % | 100 | 100 |
| Pencil Hardness (1 days), | HB | 2B |
| MEK Resistance (7 days), double-rubs | >200 | >200 |
| Impact resistance (direct), in-lbs | 112 | 12 |
| Impact resistance (reverse), in-lbs | 56 | <4 |
| Mandrel bend, inches | <1/8" | Fail |
| X-cut adhesion to CRS | 5A | 3A |
| Cross-cut adhesion to CRS | 5B | 4B |

The exemplary, non-limiting, data shown in Table 3 illustrates the improved properties of the compositions described herein. For example, the example composition was determined to have a pencil hardness of HB, which was harder than the comparative composition which had a pencil hardness of 2B, indicating that the example composition was a harder film and more resistant to certain types of deformation relative to the comparative resin composition. The impact resistance (direct) of the example composition was significantly improved over the comparative composition, as illustrated by the substantial increase to about 112 in-lbs being almost 10× that of the comparative composition. Similarly, the example composition showed a significant increase in impact resistance (reverse) relative to the comparative composition, increasing from <4 to about 56. These values for impact resistance indicated that, relative to the comparative composition, the example composition had an increased ability to deform without mechanical failure such as cracking and delaminating.

While the comparative composition failed under the mandrel bend test, the example composition was determined to have a mandrel bend of <1/8", indicating that the example composition has good flexibility. In addition, the example composition remained resistant to chemicals and solvent, as measured by MEK resistance, while showing significantly improved properties over the comparative composition.

Embodiments of the present disclosure generally relate to epoxy resin compositions and coating systems used to form epoxy resin compositions. Unlike previous technologies, embodiments of the present disclosure can be fast drying, high molecular weight resin compositions. The resin compositions can also have good mechanical properties and can be used in exterior and interior applications. Embodiments described herein also relate to coating systems. The coating systems can be used to form coating compositions that include an epoxy resin composition. The epoxy resin compositions described herein can serve as a coating, sealant, adhesive, among other applications.

Embodiments Listing

The present disclosure provides, among others, the following aspects, each of which can be considered as optionally including any alternate embodiments:

Clause 1. A resin composition, comprising:
an epoxy resin;
a curing agent; and
an acetoacetoxy-functionalized polymer having a weight average molecular weight of about 1000 g/mol to about 100,000 g/mol, the acetoacetoxy-functionalized polymer comprising: acetoacetoxy-functionalized monomer units; and co-monomer units comprising an acrylate monomer, a methacrylate monomer, an alpha-olefin monomer, a vinyl halide monomer, a diester of a carboxylic acid monomer, an unsaturated nitrile monomer, an alpha, beta-unsaturated carboxylic acid monomer, an alpha, beta-unsaturated amide monomer, or combinations thereof.

Clause 2. The resin composition of Clause 1, wherein the acetoacetoxy-functionalized polymer comprises:
about 10 wt % to about 30 wt % of the acetoacetoxy-functionalized monomer units; and
about 70 wt % to about 90 wt % of the co-monomer units, a total wt % of the acetoacetoxy-functionalized polymer not to exceed 100 wt %.

Clause 3. The resin composition of Clause 1 or Clause 2, wherein the acetoacetoxy-functionalized polymer has:
a glass transition temperature of about −50° C. to about 105° C.;
a weight average molecular weight of about 1,000 g/mol to about 60,000 g/mol; or
a combination thereof.

Clause 4. The resin composition of any one of Clauses 1-3, wherein:
an amount of the acetoacetoxy-functionalized polymer is from about 1 wt % to about 74 wt % based on a total weight of the resin composition;
an amount of the epoxy resin is from about 25 wt % to about 99 wt % based on the total weight of the resin composition; and
an amount of the curing agent is from about 1 wt % to about 74 wt % based on the total weight of the resin composition, wherein the wt % of each component is based on % solid weight basis, and the total weight of the resin composition does not exceed 100 wt %.

Clause 5. The resin composition of any one of Clauses 1-4, wherein the acetoacetoxy-functionalized monomer units, prior to polymerization, comprise an acetoacetoxy-functionalized monomer having the formula (I):

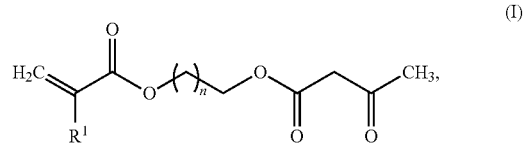

(I)

wherein:

R¹ is methyl (CH₃) or hydrogen; and n is a number from 1 to 6.

Clause 6. The resin composition of any one of Clauses 1-5, wherein, when the co-monomer units comprise acrylate monomer, methacrylate monomer, or combinations thereof, at least one of the acrylate monomer or the methacrylate monomer, prior to polymerization, comprises a co-monomer having the formula (II):

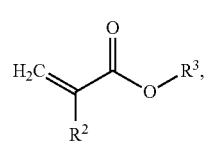

(II)

wherein:

R² is methyl or hydrogen; and

R³ comprises 1 to 30 carbon atoms.

Clause 7. The resin composition of Clause 6, wherein:

R² is methyl or hydrogen; and

R³ comprises 1 to 10 carbon atoms.

Clause 8. The resin composition of any one of Clauses 1-7, wherein the epoxy resin is a non-aromatic epoxy resin.

Clause 9. The resin composition of any one of Clauses 1-8, wherein the non-aromatic epoxy resin is a cycloaliphatic epoxy resin comprising hydrogenated cyclohexane dimethanol or diglycidyl ethers of hydrogenated bisphenol A-type epoxy resins, or combinations thereof.

Clause 10. The resin composition of any one of Clauses 1-9, wherein the curing agent comprises an aliphatic polyamine, a polyetheramine, a cycloaliphatic amine, an aromatic amine, a Mannich base, a ketimine, an oxazoline, an amidoamine, or combinations thereof.

Clause 11. The resin composition of Clause 10, wherein:

when the curing agent comprises the aliphatic polyamine, the aliphatic polyamine comprises a polyamine of formula (IVa):

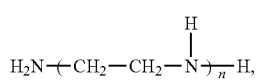

(IVa)

wherein n of formula (IVa) is 1, 2, 3, 4, 5, or 6;

when the curing agent comprises the polyetheramine, the polyetheramine amine comprises a polyetheramine of formula (IVb), a polyetheramine of formula (IVc), a polyetheramine of formula (IVd), a polyetheramine of formula (IVe), or combinations thereof:

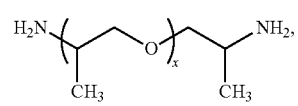

(IVb)

wherein x of formula (IVb) is from 2.5 to 68;

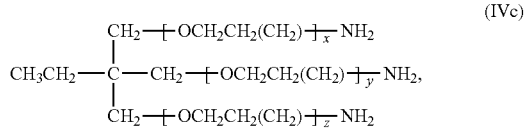

(IVc)

wherein x+y+z of formula (IVc) is from 5 to 85;

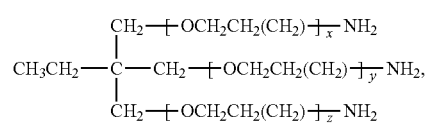

(IVd)

wherein R⁴ of formula (IVd) is hydrogen or CH₃, x of formula (IVd) is from 1 to 40, and y of formula (IVd) is from 1 to 40; or

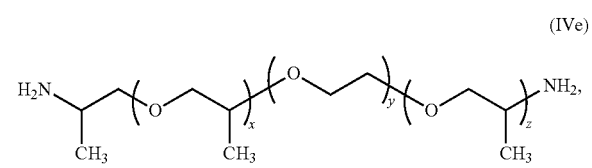

(IVe)

wherein x+z of formula (IVe) is from 1.2 to 6 and y of formula (IVe) is from 2 to 39; or combinations thereof.

Clause 12. The resin composition of any one of Clauses 1-11, wherein the curing agent is selected from the group consisting of 1,3-bis(aminomethyl)cyclohexane, diethylenetriamine, triethylenetetramine, hexamethylenediamine, trimethylhexamethylenediamine, tetraethylenepentaamine, N,N'-dimethylpropylenediamine, 1,3-bis(4-amino-3-methylcyclohexyl)methane, bis(p-aminocyclohexyl)methane, 2,2-bis(4-aminocyclohexyl)propane, 3,5,5-trimethyl-3-(aminomethyl)-cyclohexylamine, N-aminoethlpiperazine, m-phenylenediamine, p-phenylenediamine, bis(p-aminophenyl)methane, bis(p-aminophenyl)sulfone, m-xylylenediamine, 1,2-diaminocyclohexane, 1,4-diaminocyclohexane, 1,4-bis(aminomethyl)cyclohexane, and combinations thereof.

Clause 13. The resin composition of any one of Clauses 1-12, further comprising about 0.1 wt % to about 50 wt % of a solvent based on a total weight of the resin composition.

Clause 14. A composition comprising an epoxy polymerization product of a reaction mixture, the reaction mixture comprising:

an epoxy resin;

a curing agent; and an acetoacetoxy-functionalized polymer having a weight average molecular weight of about 1000 g/mol to about 100,000 g/mol, the acetoacetoxy-functionalized polymer comprising:

acetoacetoxy-functionalized monomer units; and co-monomer units comprising an acrylate monomer, a methacrylate monomer, an alpha-olefin monomer, a vinyl halide monomer, a diester of a carboxylic acid monomer, an unsaturated nitrile monomer, an alpha, beta-unsaturated carboxylic acid monomer, an alpha, beta-unsaturated amide monomer, or combinations thereof.

Clause 15. The composition of Clause 14, wherein the acetoacetoxy-functionalized polymer comprises:
about 10 wt % to about 30 wt % of the acetoacetoxy-functionalized monomer units; and
about 70 wt % to about 90 wt % of the co-monomer units, a total wt % of the acetoacetoxy-functionalized polymer not to exceed 100 wt %.

Clause 16. The composition of Clause 14 or Clause 15, wherein the acetoacetoxy-functionalized polymer has:
a glass transition temperature of about −50° C. to about 105° C.;
a weight average molecular weight of about 1,000 g/mol to about 60,000 g/mol; or
a combination thereof.

Clause 17. The composition of any one of Clauses 14-16, wherein:
an amount of the acetoacetoxy-functionalized polymer is from about 1 wt % to about 74 wt % based on a total weight of the composition;
an amount of the epoxy resin is from about 25 wt % to about 99 wt % based on the total weight of the composition; and
an amount of the curing agent is from about 1 wt % to about 74 wt % based on the total weight of the composition, wherein the wt % of each component is based on % solid weight basis, and the total weight of the composition does not exceed 100 wt %.

Clause 18. The composition of any one of Clauses 14-17, wherein:
the acetoacetoxy-functionalized monomer units, prior to polymerization, comprise an acetoacetoxy-functionalized monomer having the formula (I):

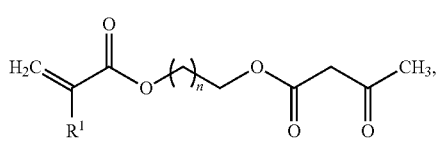

wherein:
$R^1$ is methyl ($CH_3$) or hydrogen; and
n is a number from 1 to 6;
when the co-monomer units comprise acrylate monomer, methacrylate monomer, or combinations thereof, at least one of the acrylate monomer or the methacrylate monomer, prior to polymerization, comprises a co-monomer having the formula (II):

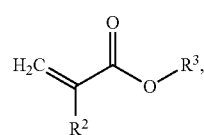

wherein:
$R^2$ is methyl or hydrogen; and
$R^3$ comprises 1 to 30 carbon atoms; or
a combination thereof.

Clause 19. A coating system, comprising:
a first component, comprising:
an epoxy resin; and
an acetoacetoxy-functionalized polymer having a molecular weight of about 1000 g/mol to about 100,000 g/mol, the acetoacetoxy-functionalized polymer comprising:
acetoacetoxy-functionalized monomer units; and
co-monomer units comprising an acrylate monomer, a methacrylate, an alpha-olefin, a vinyl halide monomer, a diester of a carboxylic acid monomer, an unsaturated nitrile monomer, an alpha, beta-unsaturated carboxylic acid monomer, an alpha, beta-unsaturated amide monomer, or combinations thereof; and
a second component comprising a curing agent.

Clause 20. The coating system of Clause 19, wherein:
the acetoacetoxy-functionalized polymer comprises about 10 wt % to about 30 wt % of the acetoacetoxy-functionalized monomer units;
the acetoacetoxy-functionalized polymer has a glass transition temperature of about −50° C. to about 105° C.;
the acetoacetoxy-functionalized polymer has a weight average molecular weight of about 1,000 g/mol to about 60,000 g/mol; or
combinations thereof.

As used herein, reference to an R group, alkyl, substituted alkyl, hydrocarbyl, or substituted hydrocarbyl without specifying a particular isomer (such as butyl) expressly discloses all isomers (such as n-butyl, iso-butyl, sec-butyl, and tert-butyl). For example, reference to an R group having 4 carbon atoms expressly discloses all isomers thereof. When a compound is described herein such that a particular isomer, enantiomer or diastereomer of the compound is not specified, for example, in a formula or in a chemical name, that description is intended to include each isomer and enantiomer of the compound described individual or in any combination.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "Is" preceding the recitation of the composition, element, or elements and vice versa, such as the terms "comprising," "consisting essentially of," "consisting of" also include the product of the combinations of elements listed after the term.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise. For example, aspects comprising "a monomer" include aspects comprising one, two, or more monomers, unless specified to the contrary or the context clearly indicates only one monomer is included.

While the foregoing is directed to aspects of the present disclosure, other and further aspects of the disclosure may be devised without departing from the basic scope thereof, and the scope thereof is determined by the claims that follow.

What is claimed is:

1. A resin composition, comprising:
   from about 25 wt % to about 99 wt % of a cycloaliphatic epoxy resin;
   a curing agent comprising an aliphatic polyamine, a polyetheramine, a cycloaliphatic amine, an aromatic amine, a Mannich base, a ketimine, an oxazoline, an amidoamine, or combinations thereof; and
   an acetoacetoxy-functionalized polymer having a weight average molecular weight of about 5,000 g/mol to about 100,000 g/mol, the acetoacetoxy-functionalized polymer comprising:
      acetoacetoxy-functionalized monomer units; and
      co-monomer units comprising an acrylate monomer, a methacrylate monomer, an alpha-olefin monomer, a vinyl halide monomer, a diester of a carboxylic acid monomer, an unsaturated nitrile monomer, an alpha, beta-unsaturated carboxylic acid monomer, an alpha, beta-unsaturated amide monomer, or combinations thereof.

2. The resin composition of claim 1, wherein the acetoacetoxy-functionalized polymer comprises:
   about 10 wt % to about 30 wt % of the acetoacetoxy-functionalized monomer units; and
   about 70 wt % to about 90 wt % of the co-monomer units, a total wt % of the acetoacetoxy-functionalized polymer not to exceed 100 wt %.

3. The resin composition of claim 1, wherein the acetoacetoxy-functionalized polymer has:
   a glass transition temperature of about −50° C. to about 105° C.;
   a weight average molecular weight of about 5,000 g/mol to about 60,000 g/mol; or
   a combination thereof.

4. The resin composition of claim 1, wherein:
   an amount of the acetoacetoxy-functionalized polymer is from about 1 wt % to about 74 wt % based on a total weight of the resin composition;
   an amount of the epoxy resin is from about 25 wt % to about 99 wt % based on the total weight of the resin composition; and
   an amount of the curing agent is from about 1 wt % to about 74 wt % based on the total weight of the resin composition, wherein the wt % of each component is based on % solid weight basis, and the total weight of the resin composition does not exceed 100 wt %.

5. The resin composition of claim 1, wherein the acetoacetoxy-functionalized monomer units, prior to polymerization, comprise an acetoacetoxy-functionalized monomer having the formula (I):

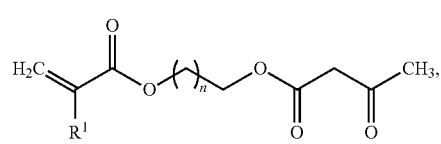

wherein:
   $R^1$ is methyl ($CH_3$) or hydrogen; and
   n is a number from 1 to 6.

6. The resin composition from claim 1, wherein, when the co-monomer units comprise acrylate monomer, methacrylate monomer, or combinations thereof, at least one of the acrylate monomer or the methacrylate monomer, prior to polymerization, comprises a co-monomer having the formula (II):

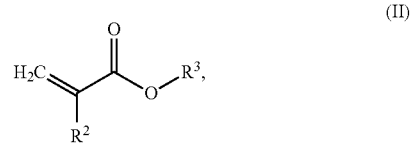

wherein:
   $R^2$ is methyl or hydrogen; and
   $R^3$ comprises 1 to 30 carbon atoms.

7. The resin composition of claim 6, wherein:
   $R^2$ is methyl or hydrogen; and
   $R^3$ comprises 1 to 10 carbon atoms.

8. The resin composition of claim 1, wherein the cycloaliphatic epoxy resin comprises cyclohexane dimethanol diglycidylether, diglycidyl ethers of hydrogenated bisphenol A-type epoxy resins, or combinations thereof.

9. The resin composition of claim 1, wherein the acetoacetoxy-functionalized polymer comprises a weight average molecular weight of about 10,000 g/mol to about 60,000 g/mol.

10. The resin composition of claim 1, wherein:
    when the curing agent comprises the aliphatic polyamine, the aliphatic polyamine comprises a polyamine of formula (IVa):

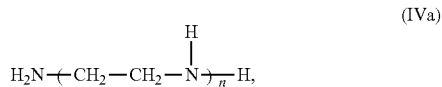

wherein n of formula (IVa) is 1, 2, 3, 4, 5, or 6;
    when the curing agent comprises the polyetheramine, the polyetheramine amine comprises a polyetheramine of formula (IVb), a polyetheramine of formula (IVc), a polyetheramine of formula (IVd), a polyetheramine of formula (IVe), or combinations thereof:

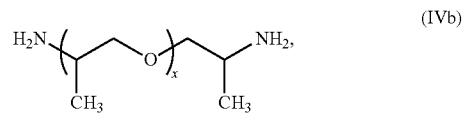

wherein x of formula (IVb) is from 2.5 to 68;

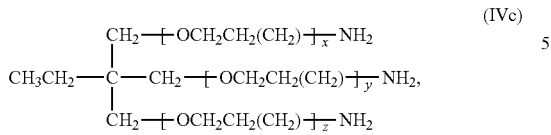
(IVc)

wherein x+y+z of formula (IVc) is from 5 to 85;

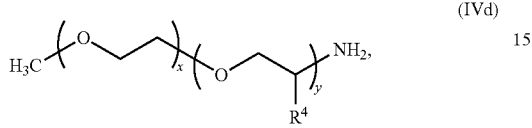
(IVd)

wherein $R^4$ of formula (IVd) is hydrogen or $CH_3$, x of formula (IVd) is from 1 to 40, and y of formula (IVd) is from 1 to 40; or

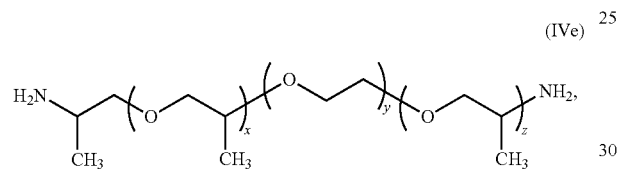
(IVe)

wherein x+z of formula (IVe) is from 1.2 to 6 and y of formula (IVe) is from 2 to 39; or
combinations thereof.

11. The resin composition of claim 1, wherein the curing agent is selected from the group consisting of 1,3-bis(aminomethyl)cyclohexane, diethylenetriamine, hexamethylenediamine, trimethylhexamethylenediamine, triethylenetetramine, tetraethylenepentaamine, N,N',-dimethylpropylenediamine, 1,3-bis(4-amino-3-methylcyclohexyl)methane, bis(p-aminocyclohexyl)methane, 2,2-bis(4-aminocyclohexyl)propane, 3,5,5-trimethyl-3-(aminomethyl)-cyclohexylamine, N-aminoethlpiperazine, m-phenylenediamine, p-phenylenediamine, bis(p-aminophenyl)methane, bis(p-aminophenyl)sulfone, m-xylylenediamine, 1,2-diaminocyclohexane, 1,4-diaminocyclohexane, 1,4-bis(aminomethyl)cyclohexane, and combinations thereof.

12. The resin composition of claim 1, further comprising about 0.1 wt % to about 50 wt % of a solvent based on a total weight of the resin composition.

13. A composition comprising an epoxy polymerization product of a reaction mixture, the reaction mixture comprising:
from about 25 wt % to about 99 wt % of a cycloaliphatic epoxy resin;
a curing agent comprising an aliphatic polyamine, a polyetheramine, a cycloaliphatic amine, an aromatic amine, a Mannich base, a ketimine, an oxazoline, an amidoamine, or combinations thereof; and
an acetoacetoxy-functionalized polymer having a weight average molecular weight of about 5,000 g/mol to about 100,000 g/mol, the acetoacetoxy-functionalized polymer comprising:
acetoacetoxy-functionalized monomer units; and
co-monomer units comprising an acrylate monomer monomer, a methacrylate monomer, an alpha-olefin monomer, a vinyl halide monomer, a diester of a carboxylic acid monomer, an unsaturated nitrile monomer, an alpha, beta-unsaturated carboxylic acid monomer, an alpha, beta-unsaturated amide monomer, or combinations thereof.

14. The composition of claim 13, wherein the acetoacetoxy-functionalized polymer comprises:
about 10 wt % to about 30 wt % of the acetoacetoxy-functionalized monomer units; and
about 70 wt % to about 90 wt % of the co-monomer units, a total wt % of the acetoacetoxy-functionalized polymer not to exceed 100 wt %.

15. The composition of claim 13, wherein the acetoacetoxy-functionalized polymer has:
a glass transition temperature of about −50° C. to about 105° C.;
a weight average molecular weight of about 5,000 g/mol to about 60,000 g/mol; or
a combination thereof.

16. The composition of claim 13, wherein:
an amount of the acetoacetoxy-functionalized polymer is from about 1 wt % to about 74 wt % based on a total weight of the composition;
an amount of the epoxy resin is from about 25 wt % to about 99 wt % based on the total weight of the composition; and
an amount of the curing agent is from about 1 wt % to about 74 wt % based on the total weight of the composition, wherein the wt % of each component is based on % solid weight basis, and the total weight of the composition does not exceed 100 wt %.

17. The composition of claim 13, wherein:
the acetoacetoxy-functionalized monomer units, prior to polymerization, comprise an acetoacetoxy-functionalized monomer having the formula (I):

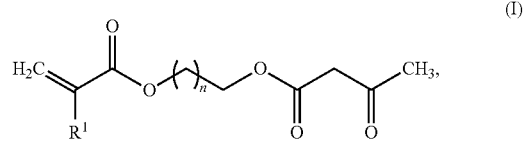
(I)

wherein:
$R^1$ is methyl ($CH_3$) or hydrogen; and
n is a number from 1 to 6;
when the co-monomer units comprise acrylate monomer, methacrylate monomer, or combinations thereof, at least one of the acrylate monomer or the methacrylate monomer, prior to polymerization, comprises a co-monomer having the formula (II):

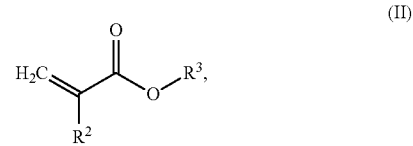
(II)

wherein:
R² is methyl or hydrogen; and
R³ comprises 1 to 30 carbon atoms; or
a combination thereof.

18. A coating system, comprising:
a first component, comprising:
  from about 25 wt % to about 99 wt % of the coating system of a cycloaliphatic epoxy resin; and
  an acetoacetoxy-functionalized polymer having a molecular weight of about 5,000 g/mol to about 100,000 g/mol, the acetoacetoxy-functionalized polymer comprising:
    acetoacetoxy-functionalized monomer units; and
    co-monomer units comprising an acrylate monomer, a methacrylate, an alpha-olefin, a vinyl halide monomer, a diester of a carboxylic acid monomer, an unsaturated nitrile monomer, an alpha, beta-unsaturated carboxylic acid monomer, an alpha, beta-unsaturated amide monomer, or combinations thereof; and
a second component comprising a curing agent comprising an aliphatic polyamine, a polyetheramine, a cycloaliphatic amine, an aromatic amine, a Mannich base, a ketimine, an oxazoline, an amidoamine, or combinations thereof.

19. The coating system of claim 18, wherein:
the acetoacetoxy-functionalized polymer comprises about 10 wt % to about 30 wt % of the acetoacetoxy-functionalized monomer units;
the acetoacetoxy-functionalized polymer has a glass transition temperature of about −50° C. to about 105° C.;
the acetoacetoxy-functionalized polymer has a weight average molecular weight of about 5,000 g/mol to about 60,000 g/mol; or
combinations thereof.

* * * * *